Figure 1:
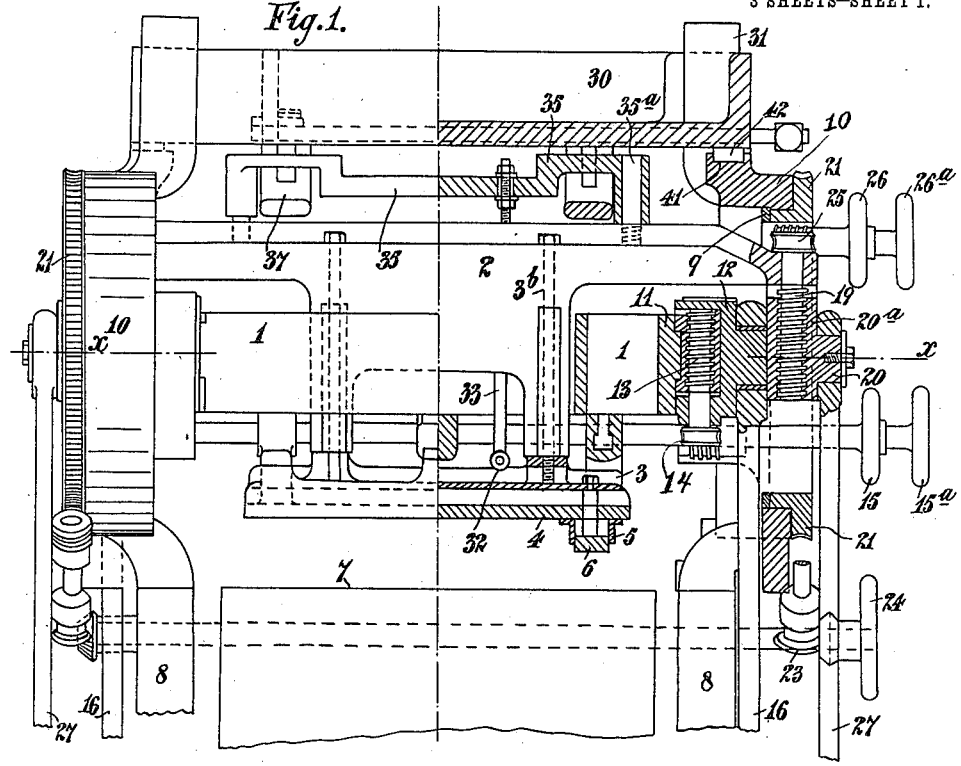

G. S. BAKER.
MACHINE FOR CUTTING DOUGH OR LIKE PLASTIC SUBSTANCES.
APPLICATION FILED OCT. 11, 1913.

1,092,817.

Patented Apr. 14, 1914.

3 SHEETS—SHEET 1.

WITNESSES

INVENTOR
GEORGE SAMUEL BAKER
BY
ATTORNEY

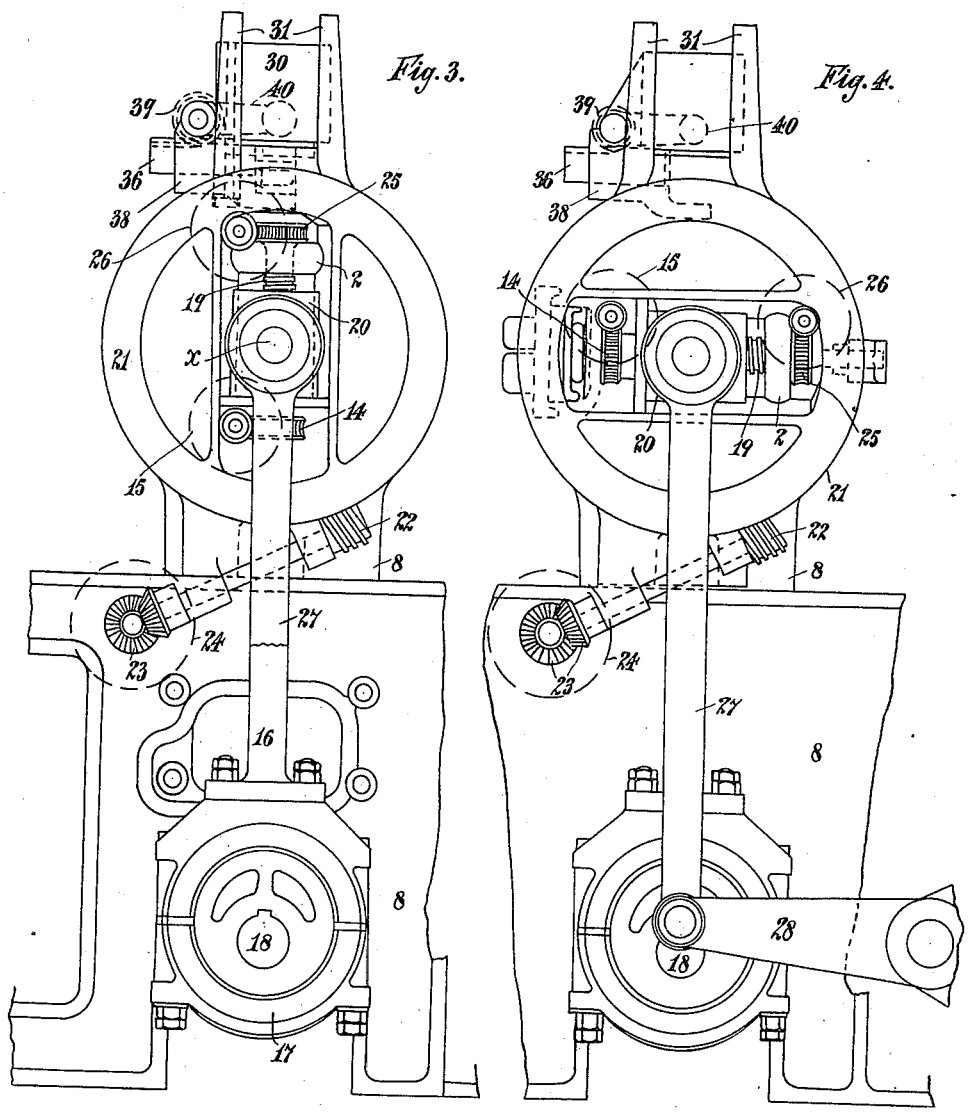

G. S. BAKER.
MACHINE FOR CUTTING DOUGH OR LIKE PLASTIC SUBSTANCES.
APPLICATION FILED OCT. 11, 1913.
1,092,817.
Patented Apr. 14, 1914.
3 SHEETS—SHEET 3.
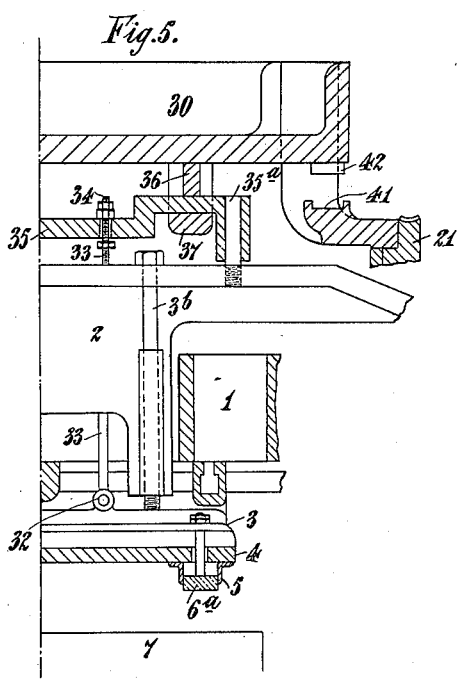
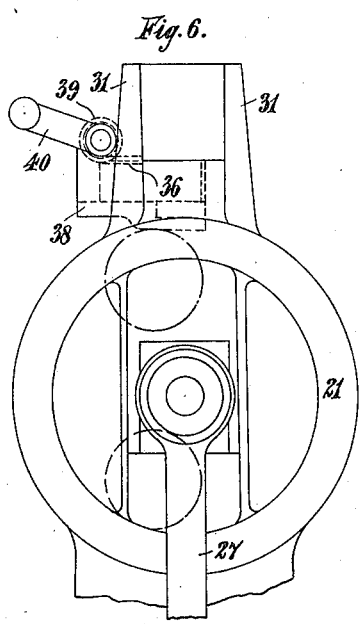
WITNESSES
INVENTOR
GEORGE SAMUEL BAKER
BY
ATTORNEY

UNITED STATES PATENT OFFICE.

GEORGE SAMUEL BAKER, OF LONDON, ENGLAND.

MACHINE FOR CUTTING DOUGH OR LIKE PLASTIC SUBSTANCES.

1,092,817.

Specification of Letters Patent. Patented Apr. 14, 1914.

Application filed October 11, 1913. Serial No. 794,589.

*To all whom it may concern:*

Be it known that I, GEORGE SAMUEL BAKER, a subject of the King of England, residing at Willesden Junction, N. W., London, in England, have invented certain new and useful Improvements in Machines for Cutting Dough or Like Plastic Substances, of which the following is a specification.

This invention relates to machines for cutting dough and like plastic substances, more particularly for use in the manufacture of biscuits and of that class in which circular, annular or other shaped cutters surround members which eject or emboss the dough or both, said cutters and embossing members being mounted on movable cross-heads or bars having particular phases of relative movement to cut the dough, emboss same when desired, and then eject it from the cutters. Such machines are also usually provided with a back plate carrying the embossers, ejectors, and scrap plate, the latter for keeping the dough from which the biscuits have been cut from rising with the cutters, said plate in some forms also being adapted to have movement relatively to the cutters and embossers, this movement being usually effected in one direction by means of springs and in the opposite direction by cams or by operative connections with either the cutter or embosser cross-head.

In such machines difficulty is experienced in cleaning the embossers of any dough which may adhere thereto owing to their normal inaccessibility, and to effectively accomplish this object it is necessary to rotate the embosser cross-head about its axis to bring the embossers into a readily accessible and visible position, in some machines the bar carrying the cutters having a releasable connection with its carrying member for this purpose, but with those constructions in which the embosser cross-head works through or is otherwise in slidable connection with the cutter cross-head, this separate rotation of the embosser cross-head is impossible owing to the spaced or separated axes of said cross-heads which are mounted for vertical movement in guides or brackets at the sides of the machine frame.

The present invention primarily consists in improved means by which the embosser cross-head may be rocked or tilted to render the embossers readily accessible for cleaning or inspection, this being accomplished by causing the axes of the cutter cross-head and embosser cross-head to be brought into alinement so that both cross-heads, which as aforesaid are in sliding connection with each other, may be rotated about a common axis. This may be accomplished in a variety of ways, but in the preferred form the side brackets mentioned are so constructed as to afford bearings or guides for the ends of the two cross-heads in different vertical planes, for example, the main vertical portion of the guide-bracket terminates at a height to receive the cutter cross-head ends or trunnions (this cross-head being usually the lowermost) and at a point below said ends the bracket is provided with a lateral extension which is directed upward in a different vertical plane to that of the main bracket to receive the embosser cross-head ends or trunnions, the ends of the embosser cross-head being bent downwardly to permit the axes of the ends of both cross-heads to come into horizontal alinement.

The lateral extensions of the brackets must be slotted for passage of the connecting-rods which operate the cutter cross-head, or the rods must be deflected or bent to clear said extensions, or the bracket members otherwise formed as to afford clearance for said rods as will be readily understood.

Where the aforesaid back plate, movable in relation to the cutter and embosser cross-heads, is employed I dispense with the springs commonly employed and referred to above and provide a sliding weight which may be located above the embosser cross-head and which is connected to said back plate by means of rods or bolts passing freely through said cross-heads, which rods or bolts must however be detached from the weight before the co-axial rotation of the cutter and embosser heads can be effected. In such case the extensions of the brackets may be carried further to receive and guide the ends of the weight.

Embodiments of the invention are shown in the accompanying drawings, in which—

Figure 2:
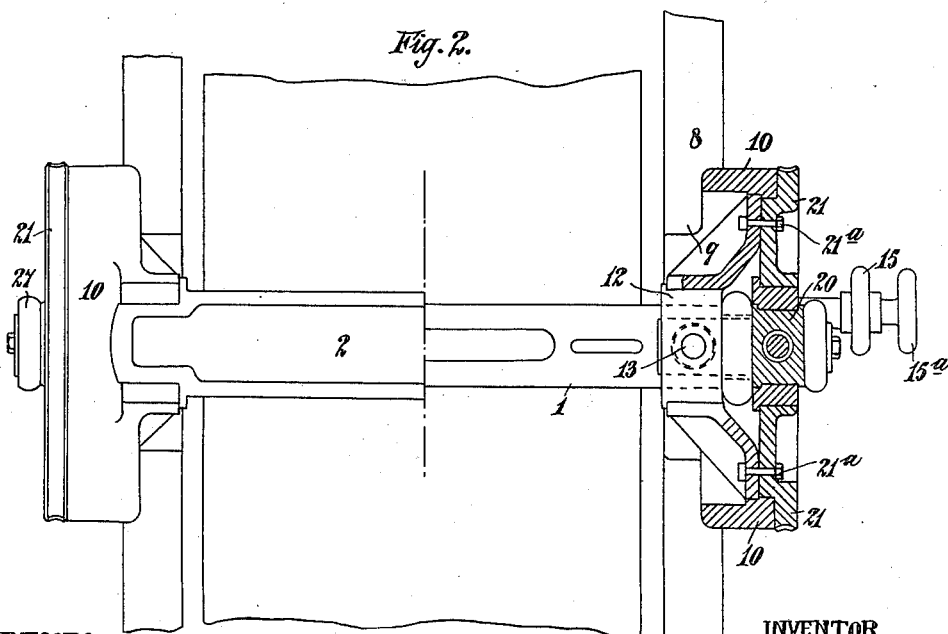

Figure 1 is a part end elevation and part section through the cutter and embosser cross-heads and appurtenant parts of a biscuit cutting machine having the present improvements applied thereto. Fig. 2 is a part plan and part sectional plan of Fig. 1. Fig. 3 is a side elevation of Fig. 1 showing also parts of the operating mechanism. Fig. 4 is a similar view to Fig. 3 with parts in different positions.

In the construction illustrated in these figures the embosser cross-head is shown in connection with the back plate and cutter bar while in Figs. 5 and 6, which are respectively a partial section and side elevation corresponding to Figs. 1 and 3, the embosser cross-head is idle and the weight previously referred to is coupled to the back plate.

Referring firstly more particularly to Figs. 1 to 4, 1 designates the cutter cross-head, 2 the embosser cross-head, and 3 the back plate. 3<sup>b</sup> designate bolts to secure said back plate to the cross-head 2 when embossing cutters are used, 4 designates the cutter-bar, 5 a cutter (only one being shown in Fig. 1) mounted on said cutter-bar, 6 an embosser carried by the back plate 3, and 7 the cutting table of the machine, all these parts being of conventional or substantially known construction.

The side frames 8, 8 of the machine in which the cross-heads are mounted, one at each side, each carry a guide member 9 for the cutter cross-head 1, this member being of annular form and rotatably mounted in a ring 10 secured to the frame. The guide 9 is provided with a slide way in which is mounted a block or bearing 11 for the end of the cutter cross-head, adjustment to vary the depth of cut of the cutters being secured by carrying said block in a frame 12 carrying a screw 13 which traverses the block 11, said screw being rotated by worm gear 14, actuated by hand-wheels 15 and 15<sup>a</sup>. The frame 12 and block 11 and consequently the cutter cross-head 1 are vertically reciprocated by a rod 16, one at each side, which is operated by an eccentric 17 on a rotary driving shaft 18 of the machine.

The embosser cross-head 2 has its ends extended downward and traversed by a screwed spindle 19 which is mounted in a block or bearing 20, having sliding bearing in an annular guide 21 connected by bolts 21<sup>a</sup> to the guide 9 for the cutter cross-head 1 and having its periphery toothed for engagement by a worm 22 operated by bevel gear 23 from a hand wheel 24 by rotating which latter both guide members 9 and 21 may be rotated in the ring 10, this action taking place at both sides of the machine.

Adjustment of the embosser cross-head 2 to vary the degree of embossing is effected by rotating the screw-spindle 19 in the block 20 by means of the worm gear 25, and hand-wheels 26 and 26<sup>a</sup>, and said block 20 and consequently the cross-head 2 are vertically reciprocated in the guide 21 by means of a rod 27 (one at each side) and lever 28 operated as by a cam (not shown). The hand-wheels referred to allow of the adjustment being made at either side of the machine as required, one wheel operates one side and one the other, or by clutching the outer wheel to the inner wheel they are both locked together and the worm shaft turns as one, thus permitting the setting of the cutters as required to give an equal pressure across the width of the table. It will thus be seen that when the axes of the blocks or bearings 11 and 20 are in alinement on a common axis $x$, that both cross-heads may be rotated about said axis to bring the cutters and embossers into accessible and visible position as shown in Fig. 4.

When cutters other than embossing cutters are used provision is made for the back plate bolts 33 to be attached to a cross bar 35 which is held in position and slides on pins 35<sup>a</sup> attached to the embosser cross-head 2, the embosser cross-head working idly by disconnecting said bolts 33.

The connection is effected between the back plate 3 and the weight 30, slidable in extensions 31 of the side frames by the following means, reference being more particularly directed to Figs. 5 and 6. The plate 3 has at each side a lug 32, to which is connected one of the bolts 33 adjustably attached by screw threads and nuts 34 to the cross bar 35 which slides on the pins 35<sup>a</sup> fixed in the embosser cross-head 2 and which is detachably connected to the weight 30 by a catch-bolt 36 which engages a perforated lug 37 depending from the weight, said catch-bolt being mounted in a suitable guide 38 and being thrown into and out engagement by racking the upper portion thereof for engagement by a pinion 39 on a hand lever 40. The side frames adjacent the extensions 31 are each provided with a rubber buffer in a pocket 41 for reception of a stop 42 on the weight.

In the operation of the machine (as illustrated in Figs. 5 and 6) the action is as follows:—The plate 3 moves with the cutter-bar 4 in the relative positions shown except at the bottom of the stroke when the stops 42 engage the buffers in pockets 41, thus causing the weight 30 to rest on the frame and cause the plate to be held at the required distance (which is adjustable by the nuts 34), from the dough on the table 7, while the biscuits are separated from the dough by the cutters 5. As the cutter-bar 4 and cutters rise again the weight 30 keeps the plate 3 down, causing the biscuits to be ejected from the cutters by the ejectors 6<sup>a</sup> and when the cutter-bar engages the plate all the parts rise together.

As before explained, when it is desired to tilt the cross-heads for cleaning or inspection of the cutters and embossers it will be necessary to put the weight 30 out of action by withdrawing the catch-bolt 36 and one side of the lug 37 is open so that the slide 35 is free to rotate with the cutters and pass clear of the lug on the weight. When embossing, the catch-bolt 36 is in the position shown in Fig. 3 and 4, and the weight rests on the buffers in the side frames of the machine, enough clearance being given in the perforated lug 37 for the cross bar 35 to work freely up and down in it without engaging the weight.

I do not limit myself to the exact construction and arrangement of parts and means for operating same as described above and illustrated in the drawings, since the same may be varied within limits determined by the appended claims without departing from the spirit of the invention.

What I claim as my invention and desire to secure by Letters Patent of the United States is:—

1. In a machine for cutting dough or like plastic substances, the combination with an embosser cross-head and cutter cross-head working through or in slidable connection with each other, of means for bringing the axes of said cross-heads in alinement, and means for rocking or tilting said cross-heads about the common axis thereof.

2. In a machine for cutting dough or like plastic substances, the combination with an embosser cross-head and a cutter cross-head working through or in slidable connection with each other, of sliding bearings for each of said cross-heads, interconnected rotary guiding members in different vertical planes supporting said bearings, means for bringing the axes of said bearings into horizontal alinement, and means for rotating said guiding means about the common axis of said bearings.

3. In a machine for cutting dough or like plastic substances, the combination with an embosser cross-head and a cutter cross-head working through or in slidable connection with each other, of sliding bearings for each of said cross-heads, interconnected rotary guiding members in different vertical planes supporting said bearings, means for adjusting said bearings in the guiding members, means for bringing the axes of said bearings into horizontal alinement, and means for rotating said guiding members about the common axis of said bearings.

4. In a machine for cutting dough or like plastic substances, the combination with an embosser cross-head, and a cutter cross-head adapted to work through or in slidable connection with each other, of a back plate in detachable connection with said embosser cross-head, embossers carried by said back plate, slidable bearings for each of said cross-heads, interconnected rotary guiding members in different vertical planes supporting said bearings, a slidable weight adapted for connection to said back plate when said embosser cross-head is disconnected therefrom, means for bringing the axes of said bearings into horizontal alinement, and means for rotating said guiding members about the common axis of said bearings.

5. In a machine for cutting dough or like plastic substances, the combination of an embosser cross-head and a cutter cross-head adapted to work through or in slidable connection with each other, of a cutter carrying bar connected to said cutter cross-head, an embosser carrying plate in detachable connection with said embosser cross-head, a slidable weight adapted for connection to said embosser carrying plate when its cross-head is disconnected therefrom, means for bringing the axes of said cross-heads into alinement, and means for rocking or tilting said cross-heads about their common axis.

6. In a machine for cutting dough or like plastic substances, the combination with an embosser cross-head and a cutter cross-head adapted to work in slidable connection with each other, a back plate in detachable connection with said embosser cross-head, embossers carried by said back plate, slidable bearings for each of said cross-heads, interconnected rotary guiding members in different vertical planes supporting said bearings, a transverse bar slidable vertically on said embosser cross-head, means for detachably connecting said bar to the back plate, a slidable weight, means for detachably connecting said weight to said bar, means for bringing the axes of the cross-head bearings into horizontal alinement, and means for rotating the guiding members aforesaid about the common axis of said bearings.

7. In a machine for cutting dough or like plastic substances, the combination with an embosser cross-head and a cutter cross-head adapted to work in slidable connection with each other, a back plate in detachable connection with said embosser cross-head, embossers carried by said back plate, a cutter bar carried by said cutter cross-head, cutters mounted on said bar surrounding the embossers, slidable bearings for each of said cross-heads, interconnected rotary guiding members in different vertical planes supporting said bearings, means for vertically adjusting said bearings in the guiding members to vary the action of the embossers and cutters, a transverse bar slidable vertically on said embosser cross-head, means for detachably connecting said bar to the back plate, a slidable weight, means for detachably connecting said weight to said bar, means for bringing the axes of the cross-head bearings into horizontal alinement, and means for rotating the guiding members aforesaid about the common axis of said bearings.

In witness whereof I have signed this specification in the presence of two witnesses.

GEORGE SAMUEL BAKER.

Witnesses:
 O. J. WORTH,
 W. E. ROGERS.